Figure 1:
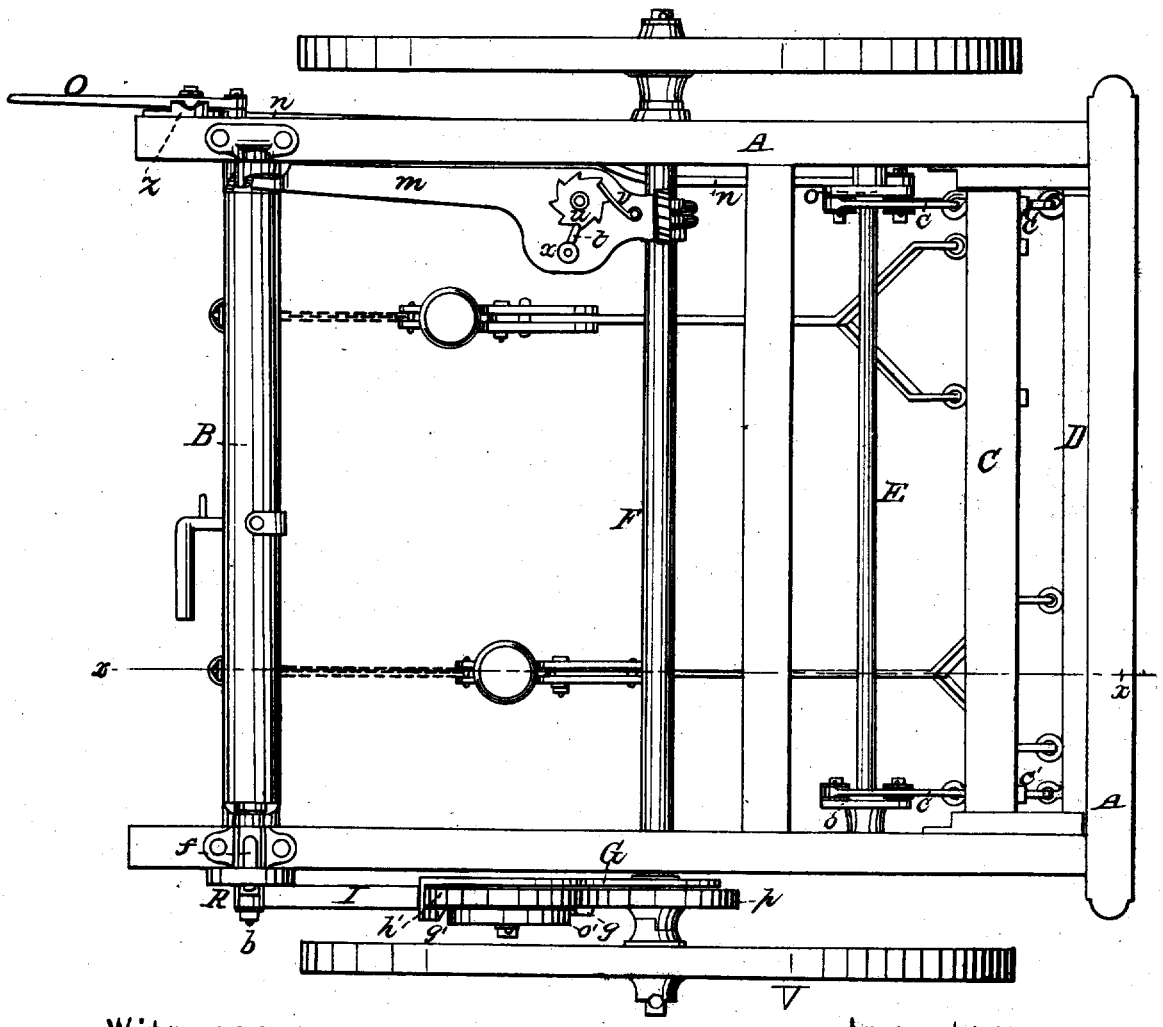

Sheet 1 - 2 Sheets.

Thomas, Mast & Gardiner.

Grain-Drill.

No. 4091. Reissued Aug. 2. 1870

Witnesses:

L. Hailor

P. T. Dodge

Inventors:

J. H. Thomas

J. P. P. Mast &

C. O. Gardiner by Dodge & Munn their attys.

Sheet 2 2 Sheets.
Thomas, Mast & Gardiner Grain-Drill.
No. 4091. Reissued Aug. 2. 1870
Fig. 2.
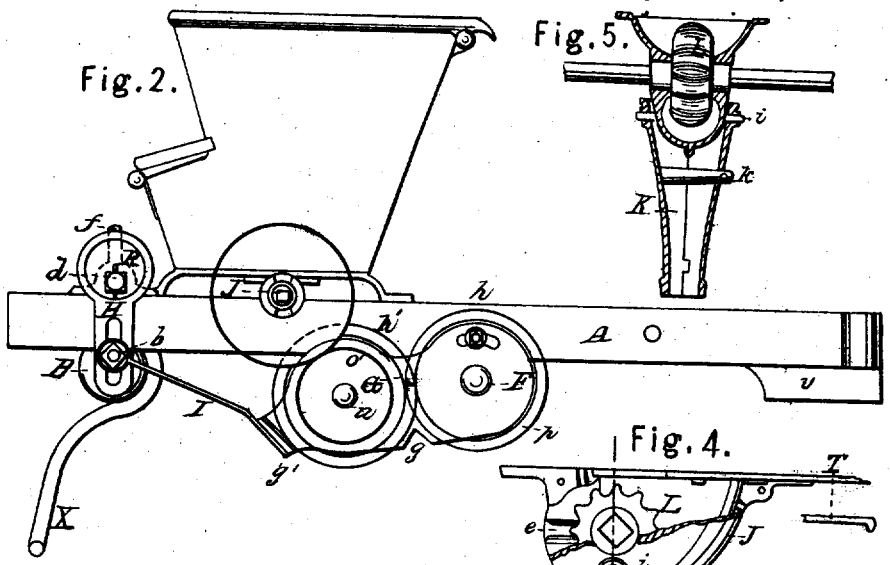
Fig. 5.
Fig. 4.
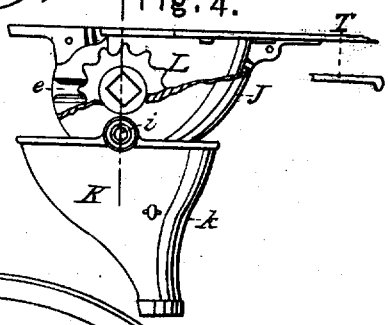
Fig. 3.
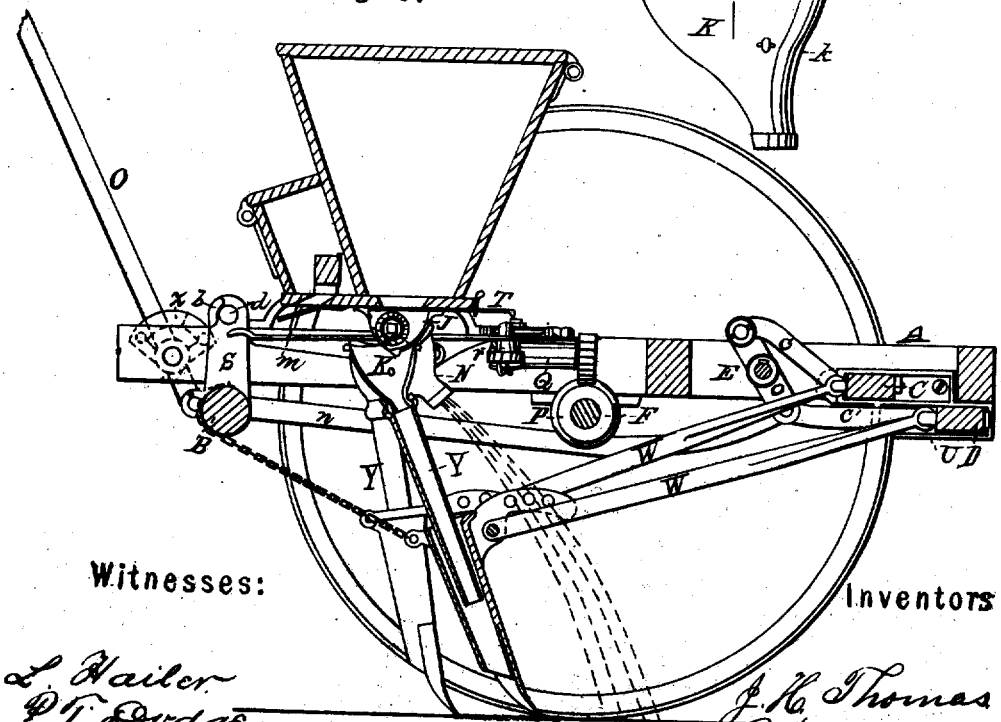
Witnesses:
L. Hailer
D. T. Dodge
Inventors
J. H. Thomas
P. P. Mast &
C. O. Gardiner
by their Attys
Dodge & Munn

UNITED STATES PATENT OFFICE.

JOHN H. THOMAS, PHINEAS P. MAST, AND CHARLES O. GARDINER, OF SPRINGFIELD, OHIO, ASSIGNORS TO JOHN H. THOMAS AND PHINEAS P. MAST, OF SAME PLACE.

IMPROVEMENT IN GRAIN-DRILLS.

Specification forming part of Letters Patent No. 93,369, dated August 3, 1869; Reissue No. 4,091, dated August 2, 1870.

*To all whom it may concern:*

Be it known that we, JOHN H. THOMAS, PHINEAS P. MAST, and CHARLES O. GARDINER, of Springfield, in the county of Clarke and State of Ohio, have invented certain new and useful Improvements in Grain-Drills; and we do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use our invention, we will proceed to describe it.

Our invention consists in certain improvements in the construction of grain-drills, which improvements relate to various parts thereof, as hereinafter explained.

Figure 1 is a top-plan view with the hopper removed. Fig. 2 is a side elevation with the wheels and drag-bars removed. Fig. 3 is a longitudinal vertical section taken on the line *x x* of Fig. 1; and Figs. 4 and 5 are views of portions detached.

In constructing our improved drill we use a frame, A, mounted on two wheels in the usual manner, the whole being mounted on an axle, F, about the center of the frame, one wheel being secured rigidly to the axle, and the other turning loosely thereon.

In this drill we use for feeding out the grain the rotating cylinders patented October 13, 1868, a series of which is located underneath the hopper on a shaft, having a spur-wheel secured to one end, and driven by a similar wheel, *p*, secured to the axle F, inside of the driving-wheel V, as shown in Fig. 1.

In this style of drill it is necessary to throw the feeding mechanism out of gear whenever it is desired to stop feeding out the grain, as in turning at the ends of the field, and also to have some means of varying the quantity of grain sown; and for these purposes we pivot upon the axle F a plate, G, Fig. 2, the rear end of which has attached to it a spring-arm, I, the rear end of this arm being secured by a bolt and nut, *b*, to a slotted bar, H, as shown in Fig. 2. This bar H is located at the rear end of the frame on one side, and has its upper end made in the form of a ring to encircle an eccentric, R, which latter is secured to a journal, *d*, on which the hoisting-bar B is pivoted eccentrically by means of arms S, as represented in Fig. 3, so that when the bar B is raised by means of its levers X to elevate the drill-tubes the eccentric R is turned down, and thereby lowers the bar H, which carries with it the rear end of plate G. On this plate G there is a stud or pin, *a*, on which is mounted a wheel, *h'*, which engages with the driving-pinion *p*, and on this same stud is also mounted another pinion, *o'*, which latter gears into the pinion on the end of the shaft on which the feed rollers or cylinders L are mounted.

By this arrangement it will be seen that, whenever the bar B is turned up to raise the drill-tubes from the ground, the same movement lowers the rear end of the plate G, and thereby throws the pinion *o'* out of gear with the pinion of the cylinder-shaft, and stops the feeding; and whenever the bar B is turned down the pinions are thrown into gear again, and the tubes dropped at the same time.

If the parts were entirely rigid, there would be danger of breaking the teeth of the pinions, as the ends of the teeth are apt to strike upon one another as they are thrown into gear; and hence we make use of the spring-arm I, which entirely obviates this danger.

In order to vary the feed, we change the pinion *o'* by substituting a larger or smaller one, as may be desired. If a larger one be used, it is obvious that it would come in contact with the pinion on the cylinder-shaft before the eccentric had assumed its proper position; and if, on the other hand, a smaller one were used, it would not be brought into gear with the pinion on the feed-shaft; and hence we provide the slot in the bar H, by which the rear end of plate G may be adjusted higher or lower, so as to enable us to use any desired size of pinion in place of *o'*, whereby we are enabled to make a great variety of changes in the feed, and thus adapt the machine to the sowing of all kinds and quantities of grain.

A still greater number of changes can be made by transposing the pinion $o'$, placing it on the end of the feed-shaft, and using that on the feed-shaft in place of $o'$. In this way we are enabled to make a great number of changes by the use of but few wheels.

As the pinions $p$ and $h'$ revolve toward each other from below, there is danger of stalks or trash getting between them and clogging or breaking them; and to prevent this we secure to the lower edge of the plate G, at a point directly below where these pinions come together, a guard, $g$, which consists of a horizontally-projecting lip or flange, as represented in Fig. 2, this flange projecting out slightly beyond the outer surface of these wheels, as shown in Fig. 1, and which, while adding but a trifle to the weight, serves, in a very effectual manner, to prevent the difficulty mentioned, there being also a similar flange or guard, $g'$, at the rear end of plate G, behind the pinion $h'$, as shown in Figs. 1 and 2.

In constructing this style of drills heretofore it has been customary to place under the feed rollers or cylinders a board, with rigid spouts, to receive the grain and convey it to the tubes, the rubber tubes being attached at their upper ends rigidly to this grain-board, their lower ends entering the drill teeth or hoes. As the tubes were thus stationary, and could not move to accommodate themselves to the changing positions of the teeth, they were liable to be chafed or collapsed by the movements of the teeth; and it was especially difficult to incline these tubes Y so as to enter and work freely within the teeth when the latter were arranged in two rows, as represented in Fig. 3. In such cases it was necessary to change one-half of the spouts above the grain-board, and also one-half of the tubes leading to the drill-teeth, in order to adapt them to the changed position of the teeth. To obviate these difficulties, we now provide a series of metal conductors or spouts, K, the form of which is shown more clearly in Fig. 4, and to the lower end of these we attach the rubber tubes Y, as shown in Fig. 3. These conductors K we make of cast-iron, in two parts, they being divided vertically through the center, as shown in Fig. 5, one half being cast with a pin, $k$, projecting from its inner face, of sufficient length to pass through a small hole in the other half, and receive a small pin outside, as shown in Fig. 4, by which the two parts are held securely together, and yet can be separated when necessary to attach it to the cup J, to which it is pivoted by ears at its upper end, on small projecting journals $i$ formed on the exterior and lower portion of the cup, as represented in Figs. 4 and 5.

The seed-cups J are of an oval or elliptical form on their horizontal section, and the spout K is made of a corresponding form, the mouth of the spout K being somewhat larger than the cup, to which it is attached so that it can be swung or oscillated back and forth, as may be required, the larger diameter of the spouts being in the direction of the line of draft of the machine. It will be observed, also, that the spout K has its smaller or lower end provided with a bead or shoulder on its exterior, to hold the tube Y on when attached. It will be further seen, also, that this lower end is so formed as to project toward the front instead of being at the center; and that thus, by turning the spout around and attaching it to the cup the other side foremost, the lower end will be thrown much farther back; and that, by alternating the spouts K, putting them on one with its lower end to the front, and the next with its lower end to the rear, they will thus have their lower ends standing zigzag in two rows, and thereby bringing the tubes Y, when connected to the spouts, more directly over the hoes when arranged in two rows. It will further be observed that the spout K, at its upper end, projects back some distance from the cup J, thus leaving an opening, through which the passage of the grain from the cup J can be observed, to see whether, at any time, any of the rolls fail to feed out the grain properly.

The diameter of the conductor is greater than that of the seed-cup, there being a space, both in front and rear, between the cup and the conductor, to permit the free oscillation of the latter. This conductor or spout K, being thus pivoted to the cup, receives the grain as it is fed out by the feed-roller L, and conveys it to the rubber tube Y, which, in turn, conveys it to the drill-tooth. By being thus pivoted the tubes Y can be inclined forward or backward, to suit the position of the drill-teeth, without trouble or danger of injuring the tubes Y, or of detaching any of the parts.

In order to insure the more certain and regular feeding or delivery of the grain, we have added another improvement to the cup or shell which incloses the feed-roller L. This improvement consists in forming on the inner face of the cup, on each side, a projection, $e$, as shown in Figs. 4 and 5, the object being to prevent the grain from being carried above that point by the roller, and cause it to flow out at the opening in an even and regular stream.

The drill-teeth are constructed and attached to drag-bars in the usual manner; but, for the purpose of changing the position of the teeth, so that they may be arranged to stand in a single or double row, at will, we attach the front end of the drag-bars W to two separate bars, C and D, the drag-bars being attached alternately to one and the other of these sliding bars C D.

In order to support and guide these cross-bars we construct a metal plate, U, Fig. 3, with grooves to receive and hold the ends of the bars C D, and attach one of these plates to the frame at its front inner corner on each side, with the ends of the cross-bars inserted in the grooves thereof. Directly in rear of these cross-bars we locate, crosswise of the frame, a rock-shaft, E, as shown in Figs. 1 and 2. Upon this shaft, near each end, we secure cross-arms *o*, which project equally at opposite sides, and to these arms we pivot, at opposite ends, rods *c* and *c'*, the opposite end of the latter being pivoted to the cross-bars C and D, as shown more clearly in Fig. 3.

It will be seen that, with these parts thus arranged, if the rock-shaft E be turned in either direction the bars C and D will be moved in opposite directions, one being shoved forward and the other drawn back simultaneously, and consequently the drag-bars, with their teeth, will also be correspondingly moved.

The length of the drag-bars being uniform, it follows that when the cross-bars C and D are moved so as to occupy the same vertical plane, or be one directly over the other, then the drill-teeth will all stand in one uniform row crosswise of the frame, in the ordinary manner of grain-drills; but when, by turning the rock-shaft E, the cross-bars C D are made to assume the position shown in Fig. 3, then the teeth are made to stand in two rows, as there represented, the teeth of the two rows alternating, the object of which is to prevent the stalks, weeds, and trash of any kind from lodging or clogging against the front of the teeth, and preventing them from entering the earth and properly depositing the seed.

When the hoes are thus arranged in two rows they will, under the operation of mechanism such as herein set forth, be disposed in planes respectively in front and in rear of the plane occupied by the hoes when arranged in one row.

By having both sets of teeth move in opposite directions to each other, the inclination of the tubes Y is divided—that is to say, one set is inclined half the distance forward, and the other set one-half the distance backward, and thus they are all left much more free to play loosely in the teeth than they would be if the entire movement were made by one set, as is the case where only one set of teeth is moved; and by having these tubes attached to the pivoted conductors K, they readily adapt themselves to these changed positions without bending or injuring the tubes Y, and without interfering at all with the elevation of the teeth, as would otherwise be the case.

In order to readily effect these changes in the position of the teeth, we pivot at the rear end of the frame a lever, O, as shown in Fig. 3, the lower end of which is connected by a rod, *n*, with one of the arms *o* of the rock-shaft E, so that by moving the lever O the cross-bars C and D, with their drag-bars and teeth, are adjusted as desired. At the point where this lever O is pivoted a plate, Z, is secured to the frame, as shown in Figs. 1 and 3, and on the outer face of this plate Z there are formed two projecting shoulders, as represented in Fig. 1, these shoulders being so arranged as to hold the lever O either forward or back, as required, the lever O being made to spring sufficiently to allow it to be thrown out beyond the shoulders when it is desired to shift it.

It is sometimes desirable to sow the grain in drills, and at the same time sow it broadcast between the drills, the object being twofold: first, if the season happens to be so wet as to destroy the seed planted deepest, or in the drills, then that sown broadcast upon the surface, not being covered so deep, will germinate and produce a crop; while, on the other hand, if the season happens to be so dry that the shallow-covered seed sown broadcast does not germinate, then that planted deeper in the drills will grow, and thus insure a crop in both wet and dry seasons.

Again, in very foul land there is danger that the seeds of weeds between the drills will spring up first, and choke the wheat or other grain in the drills, and, by sowing grain on the surface, it has a chance to start before the weeds, and thus prevent their growth.

To accomplish these objects we arrange between each pair of conductors K, that leads to the teeth, another conductor, N, as represented in Fig. 3, the conductors N and K alternating the entire length of the hopper. These conductors N are to be pivoted to a set of cups, the same as the others, but are to have their lower ends or mouths thrown forward, as shown in Fig. 3, and secured there by any suitable means, a hole being made in them and a pin inserted, which pin, resting against the front side of the cup J, serves to hold them in that position.

The only object of arranging these conductors to throw the seed in advance of the drill-teeth is that it may be covered by the drill-teeth as they stir up the earth in passing along.

In using this broadcast attachment there may be used an additional series of cups and rollers, or the machine may be so arranged as to divide the grain flowing from the ordinary set, and convey a portion, more or less, into the conductors N, the remainder being conveyed to the drill-teeth, the drill-teeth, with their cups and rollers, being arranged at any suitable distance apart.

It is sometimes desirable, especially on light prairie soils, where the winter wheat is injured by the blowing away of the soil from around the roots of the wheat, and thus exposing it to what is known as "winter-killing" or "freezing out," to protect it by sowing oats between the rows of wheat, the oats springing up and making a growth in the fall that shelters and protects the wheat, which is of slower growth, the oats being killed by the winter's cold, and falling down among and around the wheat-plants, thus preventing the earth from being blown away, and at the same time forming a mulching for the wheat.

By providing a separate hopper for the oats, or putting divisions in the same hopper, so as to feed the wheat to the drill-teeth and the oats to the broadcast-conductors, this result may be most effectually accomplished at one operation by means of our improved drill.

By these improvements we are enabled to produce a drill adapted to a great variety of purposes, and that is extremely simple and efficient.

Having set forth the construction of our improved machine in such terms that any person skilled in the art of manufacturing grain-drills may construct the same, we will now proceed to explain the principles by which it may be distinguished from other inventions.

We are aware that machines for the purpose aforesaid have heretofore been constructed with hoes, which may be adjusted in two rows, or in one row, at the discretion of the operator. Some of these machines require that the drag-bars shall be detached, and then reattached at a different part of the frame, to change the disposition of the hoes.

In other machines invented by us the drag-bars are connected in such manner that, a part of the hoes being stationary, the alternate ones may be moved forward or back to rearrange the hoes in one or two rows. This method of adjusting the hoes is set forth in another application filed at the same time with that made in this case.

In other machines the hoes are connected with such mechanism that, when one-half of the hoes are moved in one direction the alternate ones are moved in the opposite, in manner as hereinbefore set forth.

We are also aware that, in combination with such movable hoes, adjustable hoes or conductors have been used which might be shifted or connected with the orifices of discharge from the hopper, in such manner that the same tubes or spouts could be used for conveying the grain from the hopper to the hoes, whether the latter were arranged in one or two rows. But, in all cases of which we have any knowledge the said tubes or conductors have been attached to the machine, so that they required to be detached or loosened, one by one, before the hoes could be rearranged in their relations to one another in one or two rows, as the case might be.

We do not, therefore, claim, broadly, for hoes which may be adjusted in one or two rows, nor for adjustable conductors capable of being separately rearranged when the hoes are shifted, nor, broadly, for the combination of any adjustable hoes and any adjustable conductors. But our machine is distinguishable from all former inventions in the following respects: that we combine hoes which, when shifted, are moved in opposite directions, with adjustable conductors pivoted below orifices of discharge arranged in one row under the hopper, whereas in all such former machines no adequate mode of conducting the seed from the hopper to the teeth, when in two rows, is shown in the patents, and, when attempted in practice, it has been done only by means of movable rubber tubes shifted from one set of discharges to another, or by arranging them in two rows, and relying upon their bending to form the connection, neither of which is practicable with the hoes then known; and also in this, that in all former machines, when the hoes were shifted from one to two rows, or vice versa, the conductors had to be separately detached or disconnected, whereas in our machines the conductors are automatically shifted, at the same time and by the action of the same mechanism that shifts the hoes, through the action of the hoes themselves; and also in this, that we are the first to combine mechanism for simultaneously shifting the alternate hoes with adjustable conductors connecting the hopper with the hoes. In all former machines the hoes could only be rearranged by detaching the drag-bars, except in the class of machines hereinbefore referred to, in which the hoes could be simultaneously moved in opposite directions; and also in this, that in all former inventions in which the hoes were adjustable in one or more rows by detaching and shifting the drag-bars the conductors have to be detached from the frame, whereas in our machines the conductors are so pivoted below the orifices of discharge from the hopper that they will oscillate with the movement of the hoes without being detached; and also in this, that in all former inventions in which conductors have been hinged below the orifices of discharge the spouts of such orifices and the mouths of said conductors have been round or square, so that, when the conductors were in action the driver could not see whether the grain was running out of the hopper or not, whereas in our machine, the cups and conductors being both elliptical and the latter elongated, as described, the drill-hoes may be arranged nearer to one another, the driver may see whether the grain is flowing from the hopper, and the conductors may be swung forward or back to the extent necessary to adapt them to the shifting of the drill-teeth; and also in this, that elements heretofore used have been combined and arranged in the construction of our machines in diverse respects, which are new and useful, and which are hereinafter indicated in the following specification of claims.

Having thus described our improvements, what we claim is—

1. The combination of the eccentric R, lifting-bar B, and the swinging plate G, for the purpose of throwing the driving-wheels in and out of gear by the act of raising or lowering the drill-tubes, substantially as described.

2. The spring-arm I, attached to the swinging plate G, and arranged to operate substantially as described, to prevent injury to the teeth of the wheels when thrown into gear.

3. The combination of the eccentric R, slotted stirrup H, and spring-arm I with the swinging plate G, as set forth.

4. The sliding bars C and D, having the drag-bars W attached thereto, and arranged to operate as described.

5. The guard or lip *g*, arranged in relation to the wheels *p* and *h'*, substantially as described.

6. The cups J, provided with the internal ledge or projection *e*, substantially as and for the purpose set forth.

7. The conductors K, constructed, substantially as described, in two parts, and held together by the pin *k*, as set forth.

8. The plates U, provided with grooves or recesses for receiving, holding, and guiding the cross-bars C D, as shown and described.

9. The combination of the rock-shaft E, with its arms *o*, connecting-rods *c* and *c'*, cross-bars C D, and lever O, with rod *n*, arranged to operate substantially as described.

10. The combination, in a grain-sowing machine, substantially such as is herein described, of the devices for sowing grain in drills, and also sowing it broadcast between the drills simultaneously, substantially as set forth.

11. In combination, a seed-cup, J, elongated in the line of draft of the machine, and a similarly-elongated conductor, K, arranged, relatively to one another, substantially as set forth.

12. In combination with adjustables hoes, which, when arranged in two rows, are in planes respectively in advance and in rear of the plane of all the hoes when arranged in one row, adjustable conductors, pivoted below, and connecting the hopper with the hoes through the instrumentality of the tubes Y, substantially as set forth.

13. In combination with hoes adjustable in one or more rows, conductors K, pivoted so as to hang below the hopper or cups and automatically maintain the connection between the hopper or cup and the hoes through the instrumentality of the tubes Y, whether the latter are arranged in one or more rows, substantially as set forth.

14. In combination with hoes and drag-bars, and mechanism to shift the hoes into one or more rows without detaching the drag-bars, the oscillating conductors pivoted below the hopper, and maintaining the connection between the hopper and the hoes through the instrumentality of the tubes Y, whether in one or more rows, substantially as described.

15. In combination with hoes adjustable in one or more rows, conductors pivoted below the hopper, and oscillating with the movement of the hoes as shifted into one or more rows, without said conductors being detached, to maintain the connection between the hopper and hoes through the instrumentality of the tubes Y, substantially in the manner set forth.

16. In combination with the seed hopper or cups and adjustable hoes, conductors constructed substantially as described, so as to incline the discharge-opening to the front or rear, as the conductors are arranged or attached with one or the other side foremost, substantially as set forth.

JOHN H. THOMAS.
CHARLES O. GARDINER.
PHINEAS P. MAST.

Witnesses:
GEO. ARTHUR,
JAMES W. JARRETT.